United States Patent [19]
Hadaway

[11] 3,923,315
[45] Dec. 2, 1975

[54] FLUID SEAL

[75] Inventor: Bernard Milton Hadaway, Highett, Australia

[73] Assignee: Repco Research Propietary Limited, Australia

[22] Filed: Apr. 9, 1973

[21] Appl. No.: 349,174

[30] Foreign Application Priority Data
Apr. 10, 1972 Australia.............................. 8545/72

[52] U.S. Cl. ................................................ 277/134
[51] Int. Cl.² .......................................... F16J 15/32
[58] Field of Search ..................................... 277/134

[56] References Cited
UNITED STATES PATENTS
| | | | |
|---|---|---|---|
| 2,446,380 | 8/1948 | Meyers et al. .................. | 277/134 X |
| 3,497,225 | 2/1970 | Workman .......................... | 277/134 |

FOREIGN PATENTS OR APPLICATIONS
| | | | |
|---|---|---|---|
| 1,239,873 | 7/1971 | United Kingdom................. | 277/134 |
| 1,094,515 | 12/1967 | United Kingdom................. | 277/134 |

Primary Examiner—Samuel B. Rothberg
Attorney, Agent, or Firm—Stevens, Davis, Miller & Mosher

[57] ABSTRACT

A fluid seal having a generally annular body of resilient material and defining a sealing edge or lip which is engageable with a machine component. The sealing lip is defined by the junction of two angularly disposed surfaces, and a pumping configuration is applied to one of those surfaces in the form of a series of ribs which extend at an angle relative to the sealing lip. Adjacent ribs extend in substantially opposite directions so that the rib series presents a zig-zag pattern, and the pumping configuration is bi-directional. A pressure or barrier wall is provided on the seal body adjacent to the surface bearing the pumping configuration and in axially spaced relationship to the sealing lip, and during relative rotation of the seal and machine component, that wall surface should deflect fluid onto the pumping configuration so that it will be influenced towards the sealing lip.

4 Claims, 6 Drawing Figures

FLUID SEAL

This invention relates to fluid seals for use between two relatively movable members, and especially such seals as used to guard against fluid leakage between a rotatable shaft or spindle and a surrounding surface of a stationary component or assembly. It will be convenient to hereinafter describe the invention with particular reference to such seals as used in the transmission system of motor vehicles to seal against leakage of lubricant and which are commonly referred to as annular lip seals.

Lip seals generally comprise an annular body of rubber or some other suitable flexible material, and having a circular lip or sealing edge formed thereon and located radially inwardly or outwardly of the body according to the particular use of the seal. Typical seals of this kind form the subject of Australian Pat. No. 271,616, in which the lip is defined by the common edge of two adjacent and angularly disposed surfaces of the seal body. Quite often the seal body is supported by a metal ring, and a circular spring cooperates with the seal body to urge the lip against the associated shaft. The most common application of such seals is in providing sealing engagement about a rotatable shaft or spindle, in which case the sealing lip is located inwardly of the seal body, and consequently emphasis will be given to such seals in the following description. It is to be understood however, that the present invention is equally applicable to seals in which the lip is located radially outwardly of the seal body.

In practice it is found that seals of the aforementioned type allow some escape of lubricant, and a considerable amount of research has gone into attempts to find a solution to that problem. One partially successful development is the so-called "hydrodynamic" seal which relies on a configuration applied to either the seal body or to the shaft to pump escaping lubricant back towards the fluid side of the seal. For example, in one such seal as shown in U.S. Pat. No. 2,446,380, a series of ribs are formed on one of the surfaces defining the seal lip, and those ribs are arranged with their axes extending angularly relative to the shaft axis. During rotation of the shaft, oil tending to escape past the seal lip engages the ribs and is thereby deflected back towards the fluid side of the seal. That is, the return "pumping" action of the seal arises out of the combined affect of the disposition of the ribs and the movement of the oil in the direction of rotation of the shaft.

Although the hydrodynamic seals are generally an improvement on the basic form of lip seal, they still permit leakage of lubricant in sufficient quantity to be annoying, and in some cases unacceptable. It is a principal object of the present invention to provide an improved seal construction which overcomes or minimizes the problem of fluid leakage between two relatively movable members such as a rotatable shaft and a stationary mounting for that shaft.

A seal in accordance with the invention includes a pumping-type configuration which is applied to a surface at or adjacent the primary sealing zone and provides a first barrier to fluid leaking past that zone, and a pressure bead or wall located adjacent the pumping configuration and forming a second barrier to escaping fluid. That is, the pumping configuration is located intermediate the primary sealing zone and the pressure bead or wall.

The following description refers in more detail to these essential features and further optional features of the invention. To facilitate an understanding of the invention, reference is made to the accompanying drawings where these features are illustrated in preferred form. It is to be understood however, that the essential and optional features of the invention are not limited to the specific forms of these features as shown in the drawings.

Figure 1:
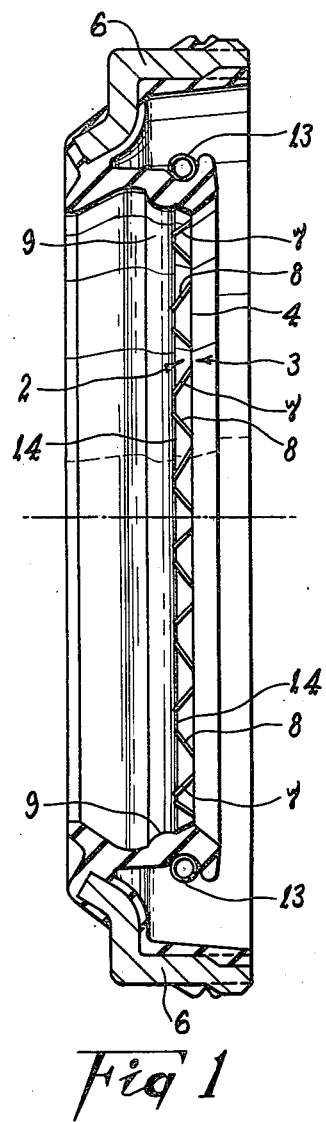
FIG. 1 is a transverse cross-sectional view of a fluid seal incorporating the present invention.

The invention is applicable to various seal constructions, but it will be convenient to hereinafter describe the invention as applied to a typical radially inner annular lip seal. Such a seal is shown in FIG. 1 and includes an axially outer wall surface 2 and an axially inner wall surface 3, both of which are annular, and which are angularly disposed relative to each other so as to meet at a common edge to form the sealing lip 4 or primary sealing zone previously mentioned. In use, the surface 3 is exposed to the oil which is to be held against leakage, and the surface 2 is usually exposed to atmosphere, and the lip edge 4 contacts the shaft or spindle 5 with which the seal is used. Other constructional features of such seals, such as the metal strengthening ring 6, are well known and will not be hereinafter particularly described.

Any one of the known pumping configurations may be applied to the surface 2 at the atmosphere side of the lip 4. For example, that configuration may comprise a series of 'V' shaped recesses cut or formed into the surface with their apexes located remote from the lip edge. Alternatively, it may comprise one or more continuous wavy or sinuous barriers extending around the axially outer lip defining surface and formed by a rib or recess in that surface. Yet another known configuration, which is shown in U.S. Pat. No. 2,446,380 and Australian Pat. No. 404,158, comprises a series of parallel ribs formed on the axially outer lip defining surface and extending at an angle relative to the axis of the shaft with which the seal is used. Still a further construction includes a helical groove or rib formed in or on the lip surface, and the latter type of construction is shown in U.S. Pat. No. 3,504,920.

In all of the foregoing constructions, the configuration is arranged so that oil moved in the direction of rotation of the member (usually a shaft) against which the seal engages, will be deflected back towards the lip edge when engaged by a surface of the configuration which is angularly disposed relative to the axis of the shaft. Some of those configurations are uni-directional in the sense that they will pump for one direction of rotation of the shaft only, whereas the others are bi-directional and will pump for both directions of rotation of the shaft. The problem of leakage is pronounced in the bi-directional configurations because, for either direction of rotation, there are primary pumping faces that tend to push lubricant back towards the fluid side of the seal, and secondary pumping faces that will tend to push lubricant further away from the seal lip. Only lubricant that has passed over or by-passed the primary pumping faces will be influenced by the secondary pumping faces, but once it is so influenced that lubricant is virtually forced out of the seal. It is this problem that the present invention mainly seeks to overcome.

Figure 3:
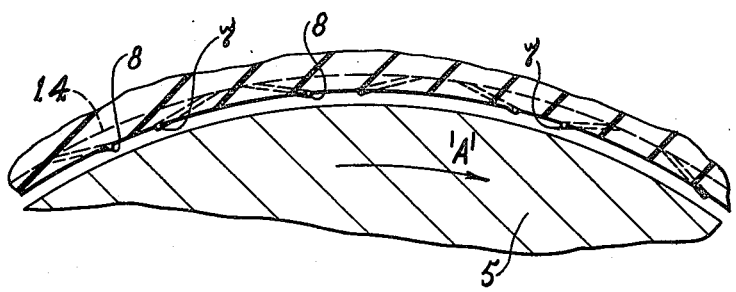
FIG. 3 is a cross-sectional view taken along line III—III of FIG. 2.
Figure 4:
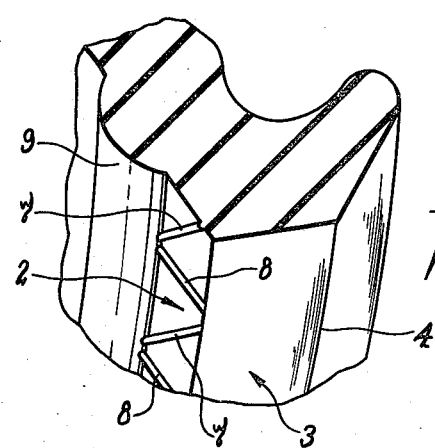
FIG. 4 is a fragmentary perspective view of a seal in accordance with the invention.

The pumping configuration used with this invention is therefor bi-directional, and in the preferred form shown in the accompanying drawings, includes what could be described as a series of rib sections which cooperate to define a helical total rib extending the full circumference of the lip surface 2 and projecting beyond that surface (see FIG. 3). The total rib is in effect formed by two groups of substantially straight rib sections which are identified as rib sections 7 and 8 respectively, and each of the rib sections 7 and 8 extends between the lip edge 4 and a pressure bead 9 located adjacent the surface 2 and axially spaced from the lip edge 4. Each of the rib sections 7 extend substantially parallel to each other and angularly relative to the rib sections 8 and the lip edge 4, and the rib sections 8 are each substantially parallel and angularly disposed relative to the lip edge 4. Thus, the rib sections define a zigzag pattern so that 'V' shaped recesses or cavities 11 and 12 are defined between adjacent rib sections 7 and 8. The cavities 11 and 12 have their apexes respectively located adjacent to and remote from the lip edge 4.

The angle 'x' (see FIG. 2) subtended between each rib section 7 and 8 and the lip edge 4, may vary according to circumstances and requirements, but an angle within the range 24° to 30° inclusive is usually applicable, and an angle of 27° is preferred. Although the total helical rib formed of rib sections 7 and 8, may be generally considered continuous, a slight gap or space may actually exist between the adjacent ends of adjacent rib sections 7 and 8 as is shown in the drawings, without disturbing the intended function of the rib.

The 'V' shaped cavities or recesses 11 and 12 formed between adjacent rib sections 7 and 8 may be considered "closed" and "open" recesses according to whether they receive leaking oil in-directly or directly respectively. That is, the recesses 12 which have their apexes located remote from the lip edge 4 open on to that edge and therefore receive leaking oil directly, whereas the recesses 11 will receive leaking oil only after it has passed over a rib section 7 or 8 from an adjacent open recess 12.

The pressure bead 9 is continuous and in the preferred construction shown extends substantially parallel to the lip edge 4. The bead 9 may have any appropriate shape in transverse cross-section, but a curved or rounded shape as shown is generally preferred. The height or radial depth of the bead 9 may vary according to circumstances or requirements, but in one typical construction for use with 2 inch to 4 inch diameter shafts, that height may be in the range of 0.025 inch to 0.030 inch inclusive, and for the same application a clearance of approximately 0.010 inch to 0.015 inch may be provided between the apex of the bead 9 and the surface of the shaft 5. It is to be appreciated however, that smaller or larger clearances may be provided.

Figure 2:
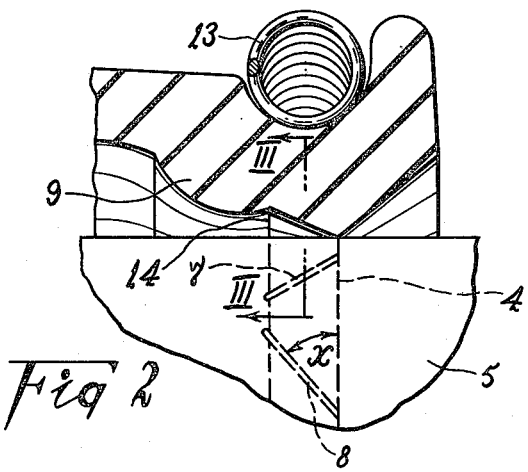
FIG. 2 is an enlarged fragmentary view of the seal shown in FIG. 1, and in which the sealing lip is depicted in engagement with a shaft.

In order to complete the seal, it is usual to locate a coil spring 13 of known construction to extend around that region defining the sealing edge 4, as is shown in FIGS. 1 and 2.

Figure 5:
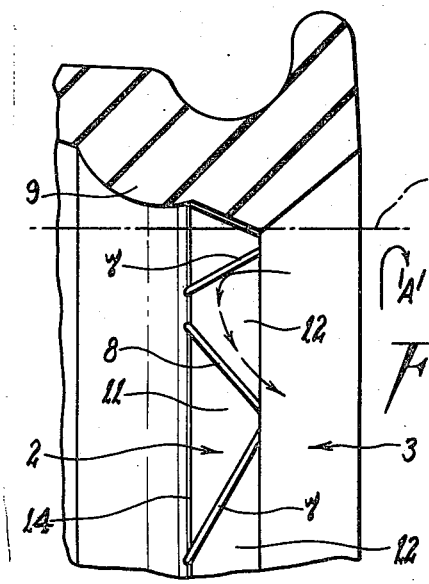
FIG. 5 is a view similar to FIG. 2 showing return of leaking fluid by the pumping configuration of the seal.

It will be understood from the foregoing that when a seal as described is mounted on a shaft 5, a catchment or weir region 14 is defined between the pressure bead 9, lip edge 4, contoured lip surface 2, and adjacent shaft surface 5; and the depth of the region 14 (which is actually in the form of a 'V' shaped circumferential groove) increases from the lip edge 4 towards the pressure bead 9. When oil leaks past the lip edge 4 during rotation of the shaft 5, it will tend to move into the open recesses 12 as shown in FIG. 5 (the direction of rotation of shaft 5 is shown by arrow 'A' in FIGS. 3, 5 and 6), and by virtue of movement of the oil in the direction of rotation of the shaft 5 it will react with the rib sections 7 so as to be urged back towards the lip edge 4 (also shown in FIG. 5). In practice at least some of the oil so urged will return past the lip edge 4 to the oil side of the seal.

Figure 6:
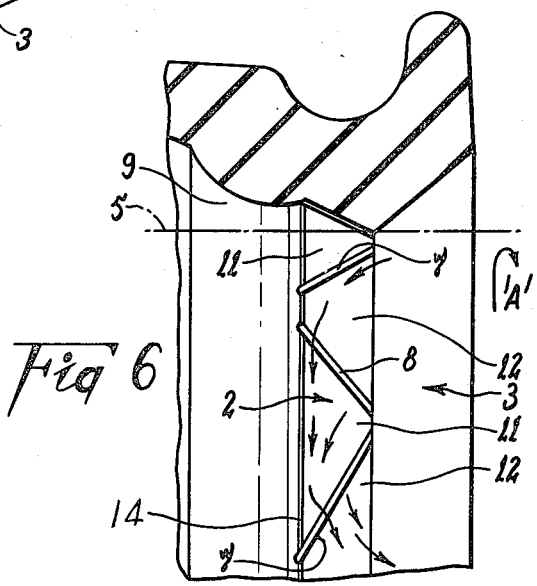
FIG. 6 is a view similar to FIG. 5 but showing a different flow situation for the leaking fluid.

Some of the leaking oil however, may spill-over the rib sections 8 into the closed recesses 11 as shown in FIG. 6, but is prevented from moving beyond the contoured surface 2 because of the barrier formed by the pressure bead 9. It is found that the oil does not accumulate within the closed recesses 11, but actually flows back into the open recesses 12 by crossing rib sections 7, and those sections then function to pump that oil as previously described. The present thought is that oil located within the closed recesses 11 is urged into the corner defined between the rib section 7, which extends generally in the direction of rotation of the shaft 5, and the pressure bead 9, because of the combined affect of the shaft rotation and the rib section disposition. A build-up of oil in that corner results with consequent spill-over into the adjacent open recess 12, since the rib sections 7 and 8 are not as high as the pressure bead 9. In fact, the rib sections 7 and 8 need only be comparatively shallow and still function as required.

It will be appreciated from the foregoing description that a seal according to the invention will greatly increase the resistance to fluid leakage in low pressure applications, such as in the transmission systems of motor vehicles. Although the invention is primarily adapted for use in rotary applications, the basic advantages may be nevertheless achieved in reciprocatory applications. Also, the second barrier need not be a bead as particularly described, but it may be formed by an upstanding wall or abutment or step in the general shape of the seal body.

Finally, it is to be understood that various alterations, modifications and/or additions may be introduced into the constructions and arrangements of parts previously described without departing from the spirit or ambit of the invention as defined by the appended claims.

Having now described my invention, what I claim as new and desire to secure by Letters Patent is:

1. A fluid seal having a generally annular body of resilient material, said body including an axially inner surface and an axially outer surface which converge to define a circular sealing edge for engagement with a machine component, an annular barrier wall located adjacent said axially outer surface and in axially spaced relationship from said sealing edge, said barrier wall projecting generally in the same direction as said sealing edge so that a fluid catchment groove is formed between said axially outer surface and the adjacent side of said barrier wall, a bi-direction pumping configuration on said axially outer surface to direct fluid towards said sealing edge during relative rotation between said seal and said machine component, said configuration comprising a series of ribs, each said rib disposed so as to extend entirely between said sealing edge and said barrier wall side at an angle relative to said sealing edge, and each alternate said rib extending substantially parallel to each other and angularly relative to the immediately adjacent said ribs whereby said barrier wall deflects fluid on to the pumping configuration so that it will be influenced towards the sealing edge.

2. A fluid seal according to claim 1, wherein the included angle defined between each said rib and said sealing edge is within the range 25° to 30° inclusive.

3. A fluid seal according to claim 1, wherein said barrier wall is defined by a continuous circumferential bead which projects radially towards said machine component and is dimensioned so as not to engage that component.

4. A fluid seal according to claim 1, wherein said sealing edge defines a radially inner peripheral edge of said body so as to be engageable with a machine component.

* * * * *